United States Patent
Totale et al.

(10) Patent No.: US 11,012,441 B2
(45) Date of Patent: May 18, 2021

(54) HYBRID AUTHENTICATION SYSTEMS AND METHODS

(71) Applicant: OPEN TEXT CORPORATION, Waterloo (CA)

(72) Inventors: Sachin Gopaldas Totale, Pleasanton, CA (US); Muneer Ahmed, Dublin, CA (US); Harish Rawat, San Jose, CA (US); Rajakumar Thiruvasagam, Bangalore (IN); Lakshmi Narayana Prasad Kakumani, Northborough, MA (US)

(73) Assignee: OPEN TEXT CORPORATION, Waterloo (CA)

( * ) Notice: Subject to any disclaimer, the term of this patent is extended or adjusted under 35 U.S.C. 154(b) by 342 days.

(21) Appl. No.: 16/015,420

(22) Filed: Jun. 22, 2018

(65) Prior Publication Data

US 2019/0007409 A1   Jan. 3, 2019

Related U.S. Application Data

(60) Provisional application No. 62/527,213, filed on Jun. 30, 2017.

(51) Int. Cl.
*H04L 29/06* (2006.01)
*G06F 21/33* (2013.01)
(Continued)

(52) U.S. Cl.
CPC .......... *H04L 63/0884* (2013.01); *G06F 21/33* (2013.01); *G06F 21/41* (2013.01);
(Continued)

(58) Field of Classification Search
CPC ............. H04L 63/0884; H04L 63/0272; H04L 63/029; H04L 63/0807; H04L 63/0815;
(Continued)

(56) References Cited

U.S. PATENT DOCUMENTS 6,081,900 A  *  6/2000  Subramaniam ...... G06Q 20/382
                                                   707/999.01
7,500,262 B1 *  3/2009  Sanin ................. G06Q 20/3674
                                                   726/2

(Continued)

OTHER PUBLICATIONS

Indu et al., Hybrid Authentication and Authorization Model for Web based Applications, IEEE WiSPNET 2016 conference (Year: 2016).*

(Continued)

*Primary Examiner* — Kambiz Zand
*Assistant Examiner* — Mahabub S Ahmed
(74) *Attorney, Agent, or Firm* — Sprinkle IP Law Group

(57) ABSTRACT

Disclosed are hybrid authentication systems and methods that enable users to seamlessly sign-on between cloud-based services and on-premises systems. A cloud-based authentication service receives login credentials from a user and delegates authentication to an on-premises authentication service proxy. The login credentials can be passed by the cloud-based authentication service to the on-premises authentication service proxy, for instance, as an access token in an authentication header. The access token can be a JavaScript Object Notation (JSON) Web Token (JWT) token that is digitally signed using JSON Web Signature. Some embodiments utilize a tunnel connection through which the cloud-based authentication service communicates with the on-premises authentication service proxy. Some embodiments leverage an on-premises identity management system for user management and authentication. In this way, there is no need for a cloud-based system to separately maintain and manage a user identity management system and/or having to sync with an on-premises identity management system.

20 Claims, 8 Drawing Sheets

(51) Int. Cl.
  *G06F 21/41*  (2013.01)
  *H04L 9/32*  (2006.01)
  *G06F 21/31*  (2013.01)
(52) U.S. Cl.
  CPC .......... *H04L 9/3213* (2013.01); *H04L 9/3228* (2013.01); *H04L 9/3247* (2013.01); *H04L 63/029* (2013.01); *H04L 63/0272* (2013.01); *H04L 63/083* (2013.01); *H04L 63/0807* (2013.01); *H04L 63/0815* (2013.01); *H04L 63/102* (2013.01); *G06F 21/31* (2013.01); *H04L 2209/76* (2013.01)
(58) Field of Classification Search
  CPC ... H04L 63/083; H04L 63/102; H04L 9/3213; H04L 9/3228; H04L 9/3247; H04L 2209/76; G06F 21/33; G06F 21/41; G06F 21/31
  USPC .......................................................... 713/168
  See application file for complete search history.

(56) References Cited

U.S. PATENT DOCUMENTS

| | | | | |
|---|---|---|---|---|
| 8,132,242 | B1* | 3/2012 | Wu | H04L 63/0884 726/8 |
| 8,464,335 | B1* | 6/2013 | Sinha | G06F 21/51 726/13 |
| 9,210,178 | B1* | 12/2015 | Roth | H04L 63/105 |
| 9,286,465 | B1* | 3/2016 | Jain | H04L 63/10 |
| 9,313,193 | B1* | 4/2016 | Mehta | H04L 63/102 |
| 9,369,433 | B1* | 6/2016 | Paul | G06F 21/572 |
| 9,544,716 | B2* | 1/2017 | Smereka | H04W 4/80 |
| 9,674,699 | B2* | 6/2017 | Kanov | H04W 12/0609 |
| 9,774,586 | B1* | 9/2017 | Roche | G06F 21/6218 |
| 9,992,186 | B1* | 6/2018 | Drozd | H04L 63/0807 |
| 10,009,337 | B1* | 6/2018 | Fischer | H04L 67/1097 |
| 10,025,599 | B1* | 7/2018 | Goodson | G06F 9/541 |
| 10,044,723 | B1* | 8/2018 | Fischer | H04L 63/0807 |
| 10,057,246 | B1* | 8/2018 | Drozd | G06F 21/335 |
| 10,205,717 | B1* | 2/2019 | Shah | G06F 21/53 |
| 10,484,331 | B1* | 11/2019 | Rossman | H04L 63/1491 |
| 10,523,445 | B2* | 12/2019 | Rossi | H04L 63/0884 |
| 2002/0099826 | A1* | 7/2002 | Summers | H04L 63/0272 709/227 |
| 2004/0193695 | A1* | 9/2004 | Salo | G06F 21/6218 709/216 |
| 2005/0097322 | A1* | 5/2005 | Gustave | H04L 63/0853 713/168 |
| 2006/0294196 | A1* | 12/2006 | Feirouz | G06F 16/957 709/217 |
| 2007/0271598 | A1* | 11/2007 | Chen | H04L 63/08 726/4 |
| 2008/0270791 | A1* | 10/2008 | Nystrom | H04L 63/0807 713/159 |
| 2011/0023103 | A1* | 1/2011 | Dietrich | G07F 7/1075 726/9 |
| 2011/0307947 | A1* | 12/2011 | Kariv | H04L 63/08 726/9 |
| 2012/0005476 | A1* | 1/2012 | Wei | H04W 12/0609 713/153 |
| 2012/0096271 | A1* | 4/2012 | Ramarathinam | G06F 9/45558 713/172 |
| 2012/0110318 | A1* | 5/2012 | Stone | G06F 21/41 713/150 |
| 2012/0331528 | A1* | 12/2012 | Fu | H04L 63/029 726/4 |
| 2013/0061306 | A1* | 3/2013 | Sinn | H04L 41/12 726/7 |
| 2013/0254847 | A1* | 9/2013 | Adams | G06F 21/6218 726/4 |
| 2014/0047517 | A1* | 2/2014 | Ding | H04L 12/1453 726/5 |
| 2014/0237230 | A1* | 8/2014 | Lehnhardt | G06F 16/242 713/165 |
| 2014/0282936 | A1* | 9/2014 | Fitzgerald | H04L 63/0272 726/6 |
| 2014/0304326 | A1 | 10/2014 | Wesley et al. | |
| 2014/0373092 | A1* | 12/2014 | Hussain | G06F 9/5072 726/3 |
| 2014/0373170 | A1* | 12/2014 | Brudnicki | G06Q 20/3226 726/27 |
| 2015/0012751 | A1* | 1/2015 | Forster | H04L 63/029 713/171 |
| 2015/0096011 | A1* | 4/2015 | Watt | H04L 63/0272 726/15 |
| 2015/0156198 | A1* | 6/2015 | Sabin | G06F 21/44 713/176 |
| 2015/0341445 | A1* | 11/2015 | Nikolov | G06F 9/5072 709/203 |
| 2015/0372982 | A1* | 12/2015 | Herle | H04L 63/0272 726/15 |
| 2015/0381580 | A1* | 12/2015 | Graham, III | H04L 63/0428 713/168 |
| 2015/0381596 | A1* | 12/2015 | Johnson | G06F 21/105 726/6 |
| 2016/0036855 | A1* | 2/2016 | Gangadharappa | H04L 63/08 726/1 |
| 2016/0088026 | A1 | 3/2016 | Mohamad Abdul et al. | |
| 2016/0112402 | A1* | 4/2016 | Schwartz | H04L 67/02 726/8 |
| 2016/0117521 | A1* | 4/2016 | Spalka | H04L 67/42 713/171 |
| 2016/0134599 | A1* | 5/2016 | Ross | G06F 21/41 713/168 |
| 2016/0234186 | A1* | 8/2016 | Leblond | H04L 63/08 |
| 2016/0261564 | A1* | 9/2016 | Foxhoven | H04L 67/1021 |
| 2017/0104639 | A1* | 4/2017 | Jiang | H04L 69/22 |
| 2017/0124340 | A1* | 5/2017 | Chiu | H04L 67/10 |
| 2017/0169434 | A1* | 6/2017 | Maddocks | G06F 21/32 |
| 2017/0208038 | A1* | 7/2017 | Hinaman | H04L 63/083 |
| 2017/0223026 | A1* | 8/2017 | Amiri | H04L 67/02 |
| 2017/0264619 | A1* | 9/2017 | Narayanaswamy | H04L 63/0281 |
| 2017/0264640 | A1* | 9/2017 | Narayanaswamy | G06F 16/951 |
| 2017/0302653 | A1* | 10/2017 | Ortner | H04L 63/0435 |
| 2017/0331812 | A1* | 11/2017 | Lander | H04L 63/083 |
| 2017/0331815 | A1* | 11/2017 | Pawar | H04L 63/083 |
| 2017/0331832 | A1* | 11/2017 | Lander | H04L 63/0807 |
| 2018/0013798 | A1* | 1/2018 | Pallas | H04L 47/193 |
| 2018/0041336 | A1* | 2/2018 | Keshava | G06F 21/33 |
| 2018/0063077 | A1* | 3/2018 | Tumuluru | H04W 28/0273 |
| 2018/0075231 | A1* | 3/2018 | Subramanian | G06F 16/86 |
| 2018/0077144 | A1* | 3/2018 | Gangawane | H04L 63/10 |
| 2018/0081983 | A1* | 3/2018 | Carru | H04L 63/0815 |
| 2018/0131685 | A1* | 5/2018 | Sridhar | H04L 67/02 |
| 2018/0159856 | A1* | 6/2018 | Gujarathi | H04L 67/10 |
| 2018/0191471 | A1* | 7/2018 | Elhaddad | H04L 1/24 |
| 2018/0288063 | A1* | 10/2018 | Koottayi | H04L 63/102 |
| 2018/0324172 | A1* | 11/2018 | Unnikrishnan | H04L 9/3213 |
| 2018/0337783 | A1* | 11/2018 | Lu | H04L 63/0807 |
| 2018/0367528 | A1* | 12/2018 | Schwarz | H04L 63/08 |
| 2018/0373885 | A1* | 12/2018 | Arad | G06F 21/629 |
| 2019/0188696 | A1* | 6/2019 | Carpenter | G06Q 20/32 |
| 2019/0207812 | A1* | 7/2019 | Li | H04L 67/10 |
| 2019/0253481 | A1* | 8/2019 | Chiu | H04L 67/10 |
| 2019/0268332 | A1* | 8/2019 | Wang | G06F 21/44 |
| 2019/0392017 | A1* | 12/2019 | Carru | G06F 16/9574 |
| 2020/0014659 | A1* | 1/2020 | Chasman | G06F 8/61 |
| 2020/0195614 | A1* | 6/2020 | Chanak | H04L 63/0272 |

OTHER PUBLICATIONS

Sharmaa et al., Identity and Access Management as Security-as-a-Service from Clouds, ScienceDirect.com (Year: 2016).*

Tamturk, "New Leap Platform & Documentum 7.3," by EMC Dell, [retrieved from <<https://cms.connected.com/News-Archive/November-2016/New-Leap-Platform-Documentum-7-3-by-DELL-EMC>>] Nov. 1, 2016, 4 pages.

(56) References Cited

OTHER PUBLICATIONS

Janze et al., "LEAP Platform Architecture Overview," by Dell EMC, Nov. 1, 2016, 22 pages.
International Search Report and Written Opinion issued for PCT Application No. PCT/CA2018/050791, dated Sep. 21, 2018, 8 pages.
International Preliminary Report on Patentability (IPRP) issued for PCT Application No. PCT/CA2018/050791, dated Jan. 9, 2020, 6 pages.

* cited by examiner

Add Connection

CONNECTION NAME

DESCRIPTION
Setup details of Auth Proxy Service running on enterprise premises

END POINT URL

☐ IS PUBLICLY ACCESSIBLE
A subscription using this connection will need Tunneling agent to be deployed On-Prem

TUNNELING PORT

Cancel    ADD

FIG. 9

Login

User Login: Enter your login — 1001

Password: Enter your password — 1001

Log In — 1003

1005

☑ Remember me    Use Corporate SSO

HYBRID AUTHENTICATION SYSTEMS AND METHODS

CROSS-REFERENCE TO RELATED APPLICATION(S)

This application claims a benefit of priority under 35 U.S.C. § 119(e) from U.S. Provisional Application No. 62/527,213, filed Jun. 30, 2017, entitled "HYBRID AUTHENTICATION SYSTEMS AND METHODS," which is fully incorporated by reference herein for all purposes

TECHNICAL FIELD

This disclosure relates generally to the field of information technology. More particularly, this disclosure relates to systems and techniques for user authentication. Even more particularly, this disclosure relates to systems and methods for hybrid user authentication that enables users to seamlessly access an on-premises system operating in a private network through a cloud-based application operating in a public network without requiring multiple separate authentication processes.

BACKGROUND OF THE RELATED ART

It is common for users to utilize Internet-based cloud computing services that provide shared computer processing resources and data to computers and other devices on demand. Cloud computing and storage solutions provide users and enterprises with various capabilities to store and process their data that may be located remotely from the users. Cloud computing relies on sharing of resources to achieve coherence and economy of scale. The same users may at the same time utilize on-premises software (sometimes abbreviated as "on-prem" or "on-premise") that are installed and run on computers on the premises of a person or organization using the software, rather than at a remote facility such as a server farm or cloud. Sometimes, it may be desirable to integrate cloud-based services (and applications) with an on-premises system. In some examples, the "on-prem" software is also remote from users, for example, at a customer premises.

Such examples present various problems and challenges. For example, the cloud-based services and applications may require secure integration with other on-premises systems. One challenge is that a common user identity may be needed for integrating the could-based services (and applications) with the on-premises systems.

In traditional distributed computing systems, there is a lack of a common authentication mechanism. As a result, a user typically has separate credentials for accessing cloud-based services hosted in a public, cloud computing environment and for accessing on-premises systems operating in a private, enterprise computing environment. The user logs into different cloud-based and on-premises systems using different credentials through separation authentication processes. Further, to allow any external device (e.g., a user working remotely) or application (e.g., a cloud-based service) to access an on-premises system, a provider or operator of the on-premises system must change their network configuration and open a port through the firewall to allow the external device or application to authenticate its user with the on-premises system.

SUMMARY OF THE DISCLOSURE

Currently, there is not a secure and fine grain integration between cloud-based services and on-premises systems. Accordingly, it is an object of the invention to provide solutions to the problems and challenges described above.

In embodiments disclosed herein, this object can be realized by providing hybrid authentication systems and methods that enable users to seamlessly sign-on between cloud-based services and on-premises systems. In some embodiments, mechanisms are provided for providing users a seamless single sign-on (SSO) between on-premises systems and cloud based services and applications. Some embodiments leverage an on-premises identity management system for user management and authentication. In some embodiments, mechanisms are provided for an identity protocol system that can work with various user identity systems or protocols. In this way, there is no need for a cloud-based system to separately maintain and manage a user identity management system and/or having to sync with an on-premises identity management system.

Some embodiments include mechanisms for providing a consumable (e.g., a calling method) with firewall restriction that uses secure tunneling capabilities to perform on-premises user authentication. Some embodiments include mechanisms for providing seamless user provisioning between on-premises identity and cloud platforms. In some embodiments, mechanisms are provided for enabling shareable user groups.

In some embodiments, a method of authenticating a user on a network may include, responsive to a user providing login credentials, authenticating the user on a cloud-based system operating in a cloud computing environment or a public network. The method may further include, responsive to the user being authenticated on the cloud-based system, invoking an authentication service of the cloud-based system and forwarding an authentication request to an on-premises system operating in an enterprise computing environment or a private network. An authentication service of the on-premises system can authenticate the user and return user credentials to the authentication service of the cloud-based system. The authentication service of the cloud-based system can then generate an authentication code for authorizing the user to access the on-premises system.

An embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 9-10 depict diagrammatic representations of a user interface of a hybrid authentication system according to some embodiments.

DETAILED DESCRIPTION

Figure 1:
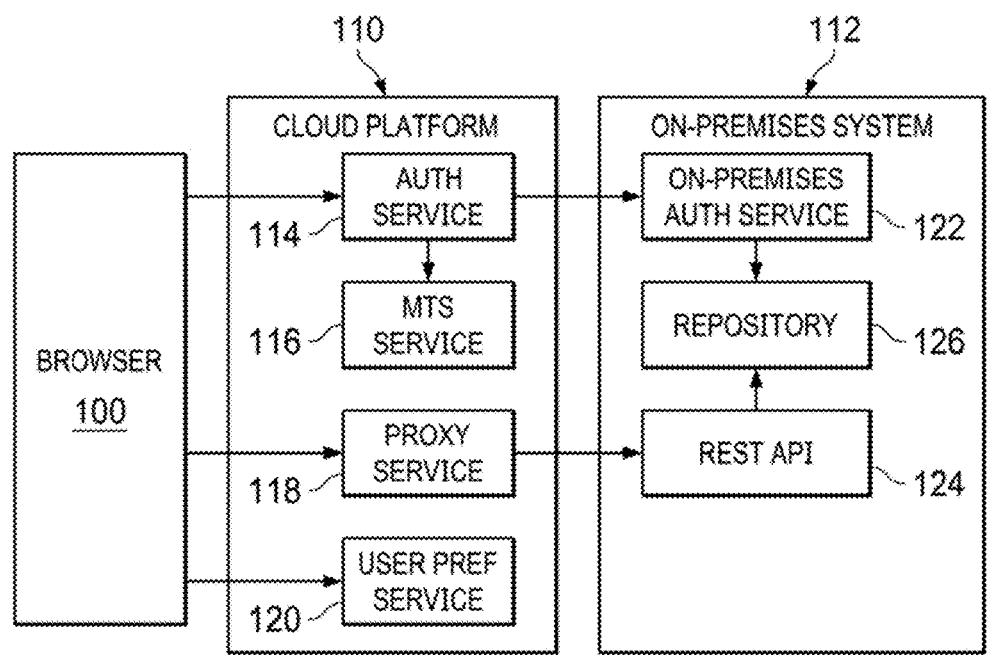
FIG. 1 depicts a block diagram of one example of a hybrid authentication deployment topology according to some embodiments.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As described above, in some embodiments, hybrid authentication systems and methods enable users to seamlessly sign-on between cloud based services and on-premises systems. These embodiments may be better understood with reference to a non-exclusive exemplary cloud-based system or cloud platform (referred to herein as the "LEAP Platform") provided by OpenText, headquartered in Waterloo, Ontario, Canada. The LEAP Platform is a flexible micro-service architecture with easily consumable Representational State Transfer (REST) application programming interfaces (APIs). Users of the LEAP Platform can build cloud-based content applications to access to enterprise content management, storage, capture, transformation and search services (collectively referred to herein as content services) hosted in the cloud. As one skilled in the art would understand, the invention may be used with any desired cloud-based services or applications.

These embodiments may also be better understood with reference to a non-exclusive exemplary on-premises system (referred to herein as Documentum® or DCTM) provided by OpenText. DCTM is an enterprise content management (ECM) platform that provides management capabilities for all types of content. DCTM includes a repository in which the content is stored securely under compliance rules and a unified environment, even though content may reside on multiple servers and physical storage devices within a networked environment. DCTM provides a suite of services, such as document management, collaboration, search, content classification, input management, Business Process Management (BPM), customer communication management, and Web content management. These functions are accessible through APIs including web services, Web Distributed Authoring and Versioning (WebDAV), File Transfer Protocol (FTP), Java, DCTM Foundation Classes (DFC), DCTM Query Language (DQL), Web Development Kit API (WDK), Server Message Block (SMB)/Common Internet File System (CIFS), and Content Management Interoperability Services (CMIS). Skilled artisans understand that embodiments can be implemented for other on-premises systems (e.g., OpenText Content Server, SAP, etc.).

Generally, this disclosure provides hybrid authentication systems and methods for enabling users to seamlessly sign-on between cloud-based systems and on-premises systems. In the context of the exemplary systems described above, a cloud-based system may require secure integration with an on-premises system. In such an integration, common user identity is desired. To this end, embodiments disclosed herein can leverage an on-premises identity management system for user management and authentication.

To enable some embodiments of a hybrid authentication system, several items may be needed to enable an exemplary hybrid-proxy use case. For example:
Modernize an existing on-premises system or application
User Interface (UI) (mobile/web) on cloud In some embodiments, such an exemplary hybrid authentication system may include several characteristics, such as:
User identity managed by an on-premises user identity management system
Most of the application logic and data are deployed on-premises
Some cloud-based services may be used To illustrate how a cloud-based system can be securely integrated with an on-premises system, in a non-exclusive example of a hybrid authentication use case, a lightweight cloud-based application running on the cloud-based system may utilize an on-premises user identity management system operating on the on-premises of an enterprise behind the enterprise's firewall. LEAP Express can be an example of a lightweight cloud-based application that is built using the LEAP Platform. The cloud-based application may use the "User-Preferences" and "Event Store" services provided by the LEAP Platform and most of the application logic and data can be on-premises. In this example of a hybrid authentication use case, the cloud-based application does not use a cloud-based identify management system. Rather, user identity is managed in the on-premises DCTM repository. As explained below, this is made possible by the hybrid authentication solution disclosed herein.

In the context of the exemplary systems described above, various enhancements to a cloud-based authentication service may be implemented. For example, content services accessible through the lightweight cloud-based application may need a user context. Typically, such a user context may contain name-value pairs that describe a client that is connected to a server. In some embodiments, the user context may include a unique context for each client, and it may last only as long as the client is connected to the server.

As a non-limiting example, a user context can be passed by a cloud-based authentication service using a JavaScript object notation (JSON) Web Token (JWT) in an HTTP authentication header. JWT is an open standard that defines a compact and self-contained way for securely transmitting information between parties as a JSON object. This information can be verified and trusted because it is digitally signed. When used for authentication purposes, once a user is logged in to a system, each subsequent request can include the access token, allowing the user to access routes, services, and resources that are permitted with the access token. The access token involves relatively small overhead and can be easily used across different domains.

Another example of an enhancement to a cloud-based authentication service may involve the creation of the token by the cloud-based authentication service after a successful authentication. A further example of an enhancement to a cloud-based authentication service may involve adding support for hybrid authentication to the cloud-based authentication service using various authentication standards, such as Native, security assertion markup language (SAML), Openld Connect (OIDC), and Hybrid DCTM Authentication. Other authentication standards may also be used.

When implementing a hybrid authentication mechanism such as that described above, various exemplary system constraints may be considered. For example, it may be preferable that existing on-premises systems do not need to be upgraded or updated.

Similarly, the hybrid authentication mechanism preferably does not require users of a cloud-based application that utilizes the enhanced cloud-based authentication service to be on an intranet or a virtual private network (VPN). It may also be preferable that the hybrid authentication mechanism supports multiple authentication schemes. In some examples, DCTM Basic and Kerberos/NTLM can be used as authentication schemes. Kerberos is a computer network authentication protocol which works using 'tickets' to allow nodes communicating over a non-secure network to prove their identity to one another in a secure manner. NT Lan Manager (NTLM) is a suite of Microsoft security protocols. Other on-premises network security and authentication schemes may also be used (e.g., IBM® Tivoli® Access Manager WebSEAL, which is a Web server that can provide single sign-on to backend Web application server resources). Preferably, such existing on-premises systems do not need to drastically change their configurations just to work with the hybrid authentication mechanism disclosed herein.

Further, it may be desirable that users can use the hybrid authentication mechanism to access the cloud-based applications and services and that such applications can access on-premises services (e.g., content services provided by DCTM) in a standard way. In such cases, no changes in the payload should be needed. Finally, the hybrid authentication mechanism should be secure.

As mentioned above, generally, in some embodiments, hybrid authentication systems and methods enable users to seamlessly sign-on cloud-based services and on-premises systems. Following is a more detailed description of an exemplary embodiment.

FIG. 1 is a block diagram of one example of a hybrid authentication deployment topology. FIG. 1 shows browser 100 that can be used by an end user to access cloud-based services provided by a cloud platform 110 (e.g., through a cloud-based application, not shown, that was built on the LEAP Platform and that runs within browser 100). In this example, cloud platform 110 includes enhanced cloud-based authentication service 114, multitenancy service (MTS) 116, proxy service 118, and user preference service 120.

Through cloud platform 110, the same end user can also access on-premises system 112. Physically, such an on-premises system can be located at a data center of a customer of cloud platform 110. In this example, on-premises system 112 includes on-premises authentication service 122, repository 126, and REST API 124 for repository 126.

In computing, REST generally refers to the software architectural style of the World Wde Web and includes a coordinated set of architectural constraints and properties based on the HyperText Transfer Protocol (HTTP). Web Services that conform to the REST architectural style, or RESTful web services, provide interoperability between computer systems on the Internet. More specifically, REST-compliant Web services allow requesting systems to access and manipulate textual representations of Web resources using a uniform and predefined set of stateless operations. Other forms of Web service may also be used, such as WSDL and SOAP.

As a non-limiting example, repository 126 can implement a DCTM repository and REST API 124 can implement a DCTM D2 REST API. DCTM D2 is an advanced, intuitive, and configurable content-centric web-based client for DCTM.

In some embodiments, on-premises authentication service 122 can be deployed on on-premises system 112. On-premises authentication service 122 can be stateless and can implement DCTM Basic and Kerberos authentication schemes against repository 126. The Kerberos authentication can simulate what the browser/Kerberos client would do.

In some embodiments, on-premises authentication service 122 can be implemented in a public cloud demilitarized zone (DMZ) so that it is accessible by end users through cloud platform 110. In some examples, on-premises authentication service 122 can be accessible by end users through a tunneling protocol (described below). Generally, a tunneling protocol allows a user to access or provide a network service that the underlying network does not support or provide directly. A use of a tunneling protocol is to allow a foreign protocol to run over a network that may not support that particular protocol. More detailed examples are provided below.

In the example of FIG. 1, a user directs browser 100 on a user device to a network address (e.g., universal resource locator or URL) where a cloud-based application resides in cloud platform 110. Browser 100 is redirected by the cloud-based application to cloud-based authentication service 114. Cloud-based authentication service 114 displays, through browser 100, a login page to the user. The user enters their credentials (e.g., a unique username or email address, and a password) into the login page and clicks on a button to submit their credentials. Cloud-based authentication service 114 is operable to determine whether hybrid authentication is enabled. If so, it invokes on-premises authentication service 122 to authenticate the credentials provided by the user. As discussed above, content services accessible through the cloud-based application may need a user context. In this case, the user context may contain name-value pairs that describe a client device associated with the user. The user context is passed to on-premises authentication service 122 by cloud-based authentication service 114 using a token (e.g., a JWT token) in an HTTP authentication header.

FIGS. 2-5 show more detailed examples of a hybrid authentication mechanism in the context of a cloud platform (on which a cloud-based application such as application 214 and a cloud-based authentication service such as authentication service 214 run) and an on-premises system (where a content server such as content server 222 operates on the premises of an enterprise, behind the firewall of the enterprise's private computer network). In the examples depicted in FIGS. 2-5, a user (e.g., an employee of the enterprise/tenant that operates the on-premises system) who authenticates to an on-premises repository using their existing credentials (e.g., a unique username or email address, and a password) can also access a cloud-based application seamlessly without having to separately login to the cloud-based application. When the user visits the cloud platform with tenant-specific and/or subscription-specific context, and if the enterprise/tenant has activated hybrid authentication (e.g., by a tenant administrator using an administrator account with the cloud platform through an administrator interface, dashboard, etc., as illustrated in FIGS. 9-10), then the cloud-based authentication service can delegate authentication to an on-premises authentication service proxy.

The on-premises authentication service proxy is a proxy of the cloud-based authentication service that is deployed on the premises of the enterprise to authenticate users against the on-premises content server or repository using different authentication schemes such as DCTM Basic, Kerberos protocol, etc. This kind of authentication setup is referred to as hybrid authentication. FIGS. 2-5 show examples of hybrid authentication deployment arrangements according to some embodiments. Other hybrid authentication deployment arrangements are also possible.

Figure 2:
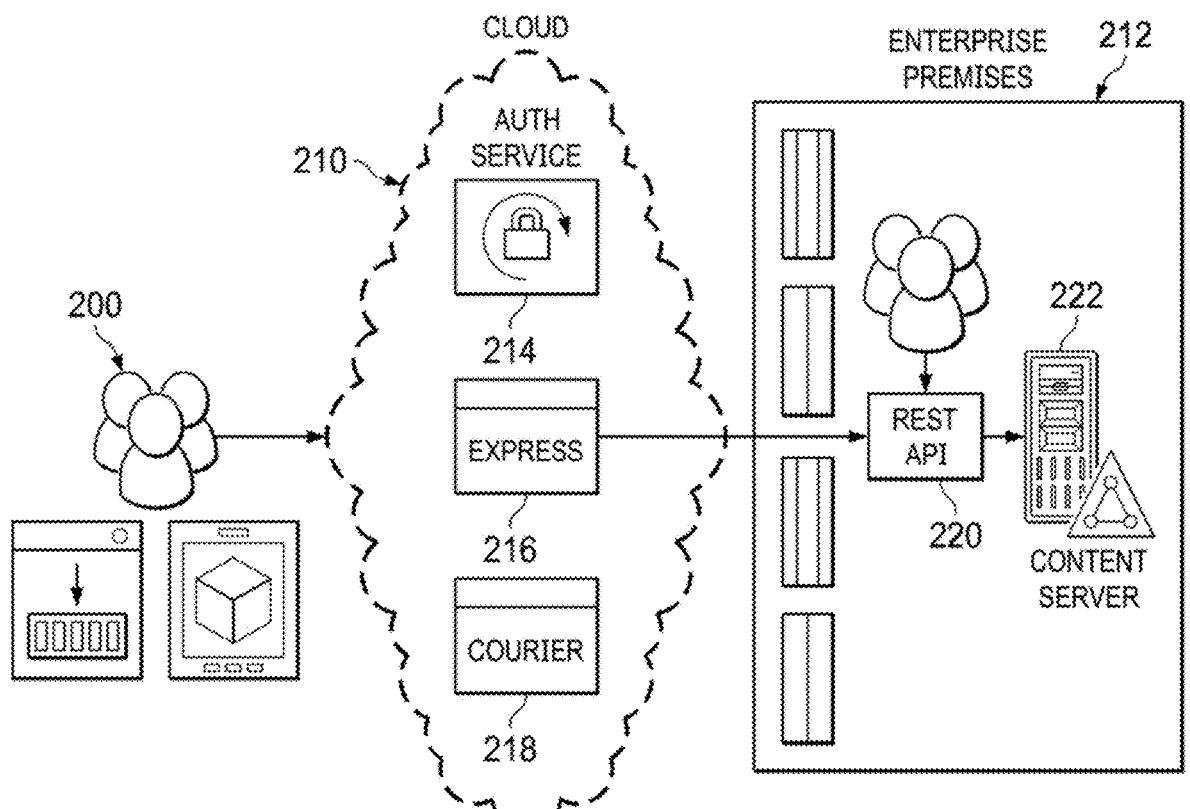
FIG. 2 depicts a block diagram of one example of a hybrid authentication system according to some embodiments.

FIG. 2 depicts a block diagram showing users 200, cloud 210, and enterprise premises 212. Cloud 210 includes cloud-based authentication service 214, cloud-based application "Express" 216, and cloud-based application "Courier" 218. Both "Express" and "Courier" are enterprise class applications. Express is built for enabling enterprise users to quickly access, review, and approve enterprise content regardless of where they are. Courier is built for enabling enterprises to collect and exchange files securely with customers, partners, and suppliers across networks and firewalls. In this example, "Express" and "Courier" are non-limiting examples of cloud based applications that a user can access by logging into their cloud account with cloud 210. Other cloud based applications may also be implemented. Enterprise premises 212 includes content server 222 and REST API 220. Cloud-based application 216 communicates with content server 222 using REST API 220. REST API 220 can be an embodiment of REST API 124 described above. DCTM repository can be an example of content server 222.

In some embodiments, REST API 220 can be a Web service. In some embodiments, REST API 220 is enhanced to accept HTTP authorization header with a bearer access token encoded as a JWT token digitally signed using JSON Web Signature (JWS). JWS is a proposed standard for signing arbitrary JSON and can be used as the basis for a variety of Web based technologies including JWT. In authentication, when a user successfully logs in using their credentials, a JWT token is returned and saved locally in a local or session storage. Whenever the user wants to access a protected route or resource, the JWT token is passed through to the protected route or resource in the HTTP authorization header using the bearer schema known to those skilled in the art. This is a stateless authentication mechanism as the user state is never saved in server memory. The server's protected routes will check for a valid JWT token in the HTTP authorization header, and if it is present, the user will be allowed to access the protected server resources. Each JWT token is self-contained with all the necessary information.

A JWT token generally has three parts: a header, a payload, and a signature. As a non-limiting example, a header of a JWT token can have a header parameter that identifies which algorithm is used to generate the signature (e.g., "RS256"), a header parameter that identifies the token type (e.g., "JWT"), and a header parameter for a key identifier (e.g., "KID"), as illustrated below:

```
Header
{
  "alg": "RS256",
  "typ": "JWT",
  "kid": "e1750ed90ca1267bf8f7465d7190a838e8d484b1"
}
```

As a non-limiting example, this JWT token can contain the following payload:

```
Body
{
  "sub": "joe@acme.com",
  "userId": "joe",
  "authDatabase": "acme1",
  "iss": "https://.../authserver",
  "exp": ...
}
```

In some embodiments, REST API 220 can get the user context from the JWT token (e.g., the body or the "payload") thus passed through. REST API 220 can extract a user identity (e.g., the value of "userId" in the example above) from the token and establish a network session with content server 222 (e.g., using an administrative account). REST API 220 can get the authentication service public certificate for the key identifier in the header and verify the digital signature. REST API 220 can cache the authentication service public certificate for the key identifier in the header. REST API 220 can also create a session for the user (e.g., using an impersonation feature support by the administrative account) extracted from the token and make a content server call using the impersonated session (to fulfill the request from cloud-based application 216). In this case, REST API 220 is acting as an admin-level user that impersonates an end user who's logged into cloud-based application 216 and who also wishes to access content server 222.

In some embodiments, the hybrid authentication process may also include other steps. For example, the hybrid authentication process may include requirements specific to a cloud platform for supporting hybrid authentication. Support can be added to a cloud-based authentication service using, for instance, a plug-in. For other cloud-based services, similar steps may be desired. Further, an on-premises repository, to which an end user is connecting through the cloud platform, should support the impersonation feature.

Figure 3:
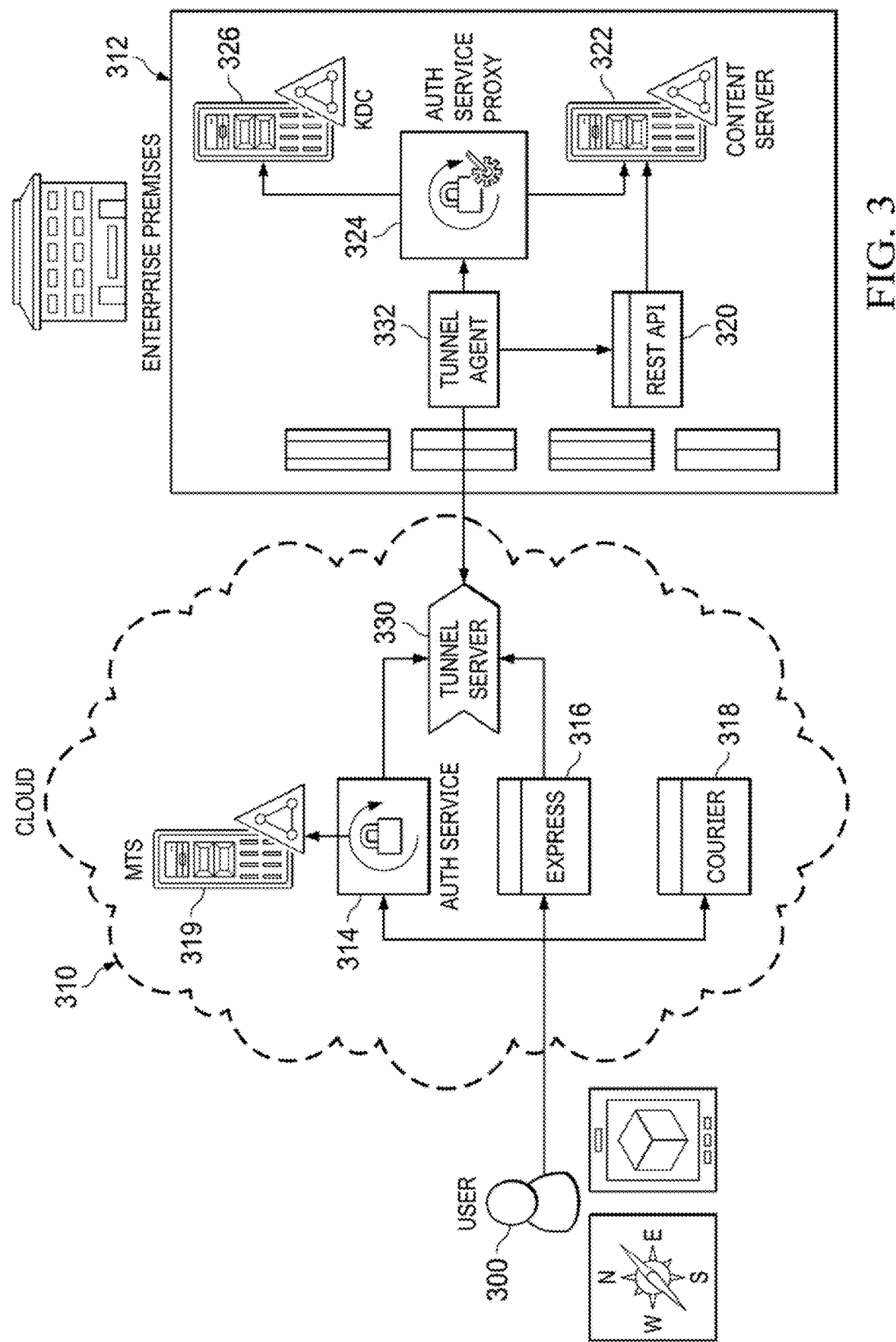
FIG. 3 depicts a block diagram of one example of a hybrid authentication system using a tunneling protocol according to some embodiments.
Figure 4:
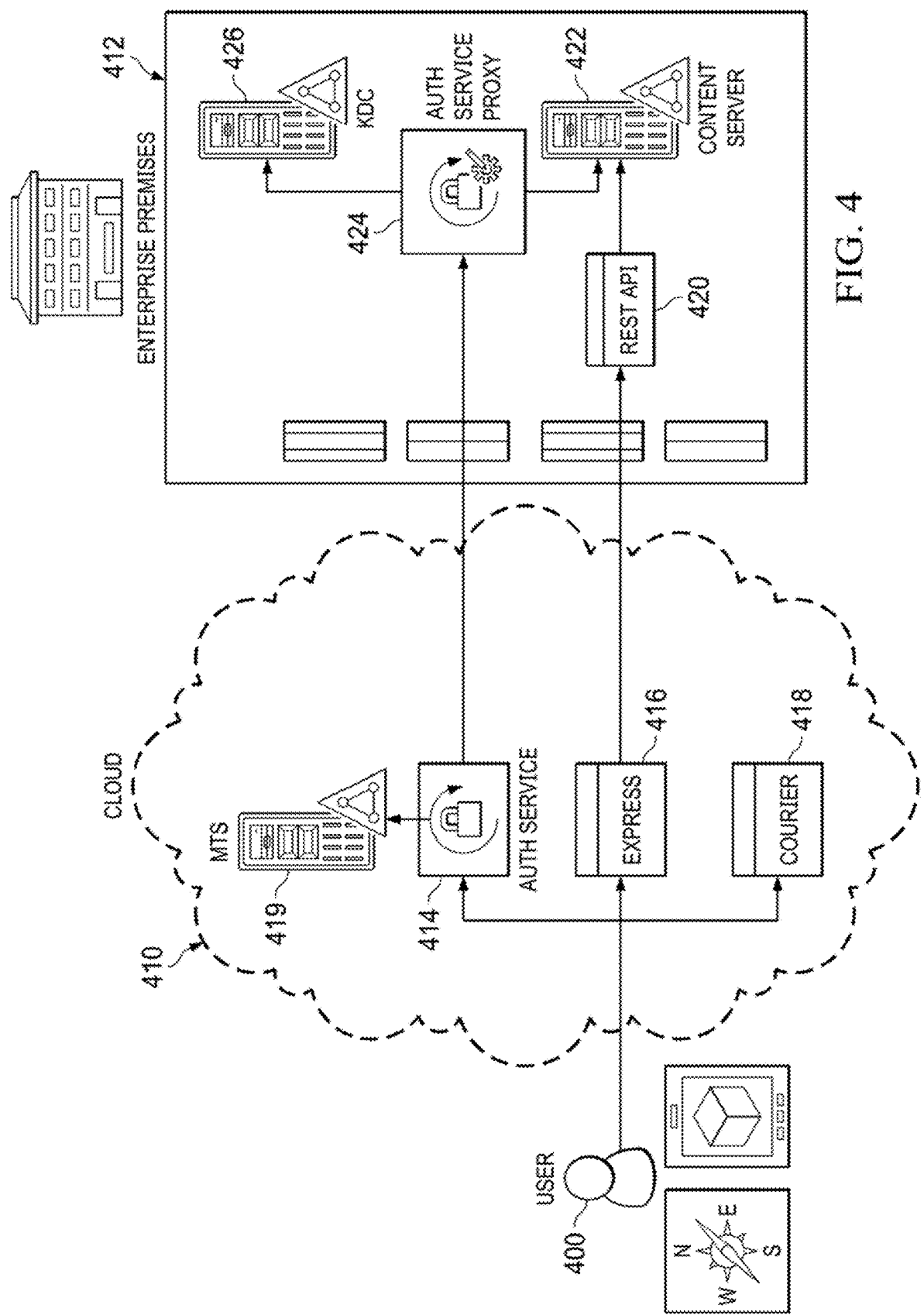
FIG. 4 depicts a block diagram of another example of a hybrid authentication system according to some embodiments.

FIGS. 3-4 are diagrammatical examples of hybrid authentication systems, one using tunneling (FIG. 3) and one without (FIG. 4). FIG. 3 shows user 300, cloud 310, and enterprise premises 312. Similar to embodiments described above, cloud 310 includes cloud-based authentication service 314, cloud-based application "Express" 316, cloud-based application "Courier" 318, and MTS service 319. Enterprise premises 312 includes REST API 320, content server 322, on-premises authentication service proxy 324, and a domain service for active directory or Key Distribution Center (KDC) 326. In cryptography, a KDC is part of a cryptosystem intended to reduce the risks inherent in exchanging keys. KDCs often operate in systems within which some users may have permission to use certain services at sometimes and not at others. In this example, on-premises authentication service proxy 324 is deployed on enterprise premises 312 to authenticate users against content server 322 within enterprise premises 312 (i.e., the network domain on an enterprise's premises) using different authentication schemes such as DCTM Basic, Kerberos protocol, etc.

FIG. 3 shows an exemplary deployment option using a tunneling protocol (through tunnel server 330 operating in cloud 310 and tunnel agent 332 operating behind the firewall in enterprise premises 312) to allow user 300 to access enterprise premises 312. The tunneling protocol provides a network service that the underlying network (cloud 310) may or may not support or provide directly. In this example, tunnel server 330 can communicate with cloud-based authentication service 314 and cloud-based application 316. Tunnel server 330 can also communicate with tunnel agent 332 deployed on enterprise premises 312. Tunnel agent 332 communicates with on-premises authentication service proxy 324 and REST API 320 operating within enterprise premises 312. An example operation is described below with reference to FIG. 6.

FIG. 4 shows user 400, cloud 410, and enterprise premises 412. Similar to embodiments described above, cloud 410 includes cloud-based authentication service 414, cloud-based application "Express" 416, cloud-based application "Courier" 418, and MTS service 419. Enterprise premises 412 includes REST API 420, content server 422, on-premises authentication service proxy 424, and KDC 426. In this example, on-premises authentication service proxy 424 is deployed on enterprise premises 412 to authenticate users against content server 422 using different authentication schemes such as DCTM Basic, Kerberos protocol, etc.

FIG. 4 shows an exemplary deployment option that does not rely on a tunneling protocol (i.e., without a tunnel server such as tunnel server 330 and without a tunnel agent such as tunnel agent 332). In this example, cloud-based authentication service 414 and cloud-based application 416 communicate with on-premises authentication service proxy 424 and REST API 420, respectively. An example operation is described below with reference to FIG. 7.

Figure 5:
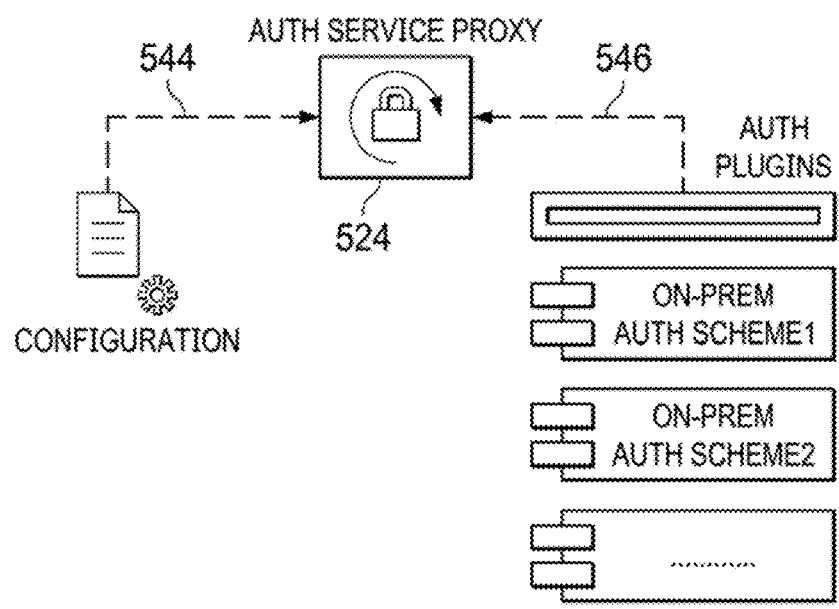
FIG. 5 depicts a block diagram illustrating the operation of the authentication service proxy shown in FIGS. 3 and 4 according to some embodiments.

FIG. 5 depicts a block diagram illustrating the operation of on-premises authentication service proxy 524 (which, in some embodiments, can be implemented as on-premises authentication service proxy 324 or on-premises authentication service proxy 424). FIG. 5 shows that on-premises authentication service proxy 524 can be configured with configuration information 544 and information 546 from multiple authentication plugins. As a non-limiting example, configuration information 544 can include the following parameters:

```
authenticator:
  documentum:
    basic:
      doc-broker-host:
      doc-broker-port:
    Kerberos:
      kdc-host:
      kdc-relam:
```

In some embodiments, on-premises authentication service proxy 524 can be a Web service deployed on the premises of an enterprise (e.g., enterprise premises 312, enterprise premises 314, etc.) and responsible for authenticating users (e.g., users 300, users 400, etc.) against an on-premises repository or content server using different on-premises authentication schemes, such as DCTM Basic, DCTM Kerberos protocol, etc.

In some examples, on-premises authentication service proxy 524 can be configured based on a pluggable model to which any new authentication module can be plugged-in. In some embodiments, on-premises authentication service proxy 524 can be developed as a spring boot application. In some embodiments, on-premises authentication service proxy 524 can be packaged as a standalone runnable package (e.g., in a package file format such as Java ARchive (JAR) or Web application ARchive (WAR)). In some embodiments, on-premises authentication service proxy 524 may expose an end point '/login' that authenticates a user (e.g., user 300 or user 400).

Figure 6:
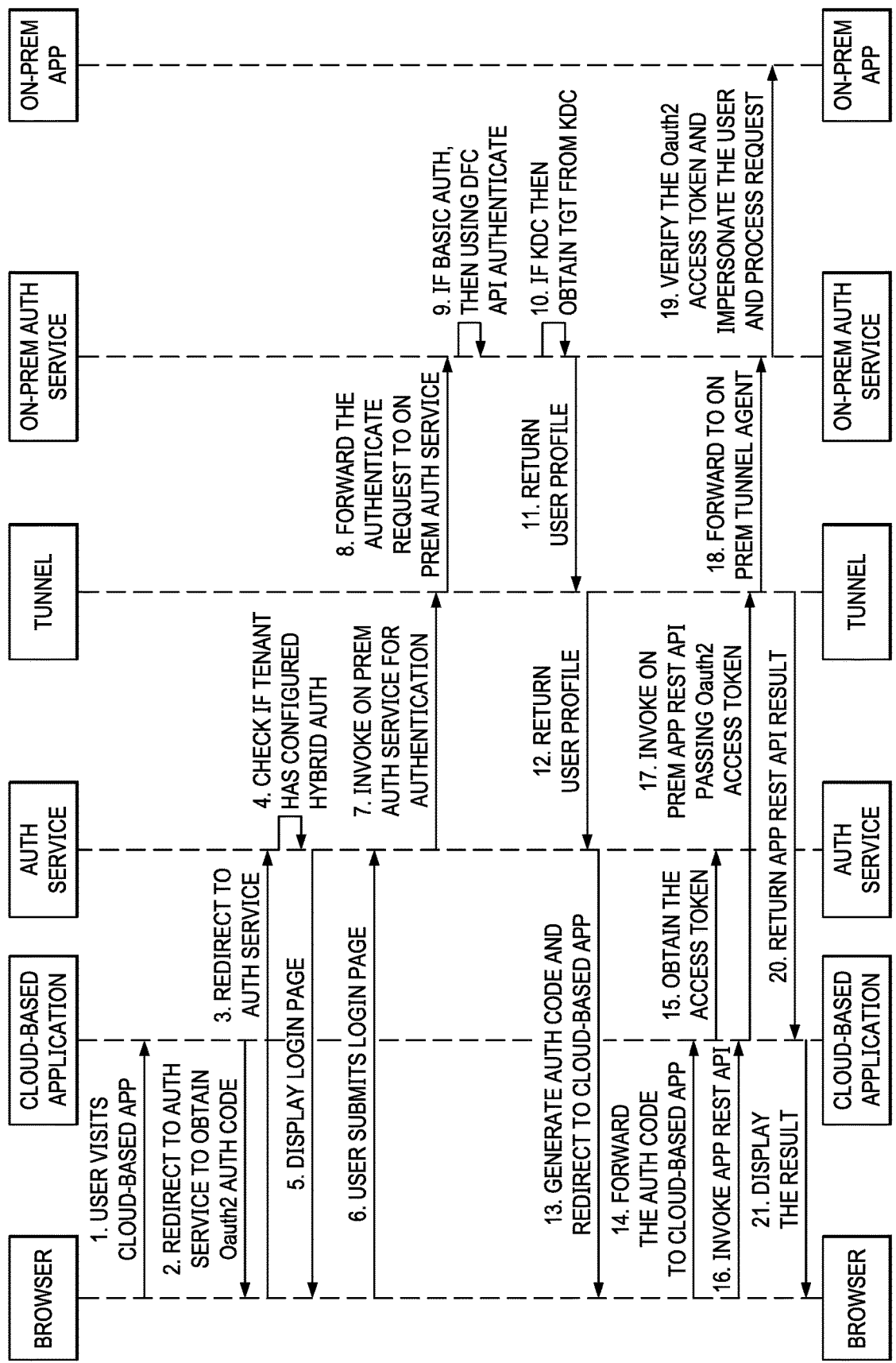
FIGS. 6-8 depict hybrid authentication flow sequence diagrams showing exemplary implementations according to some embodiments.
Figure 7:
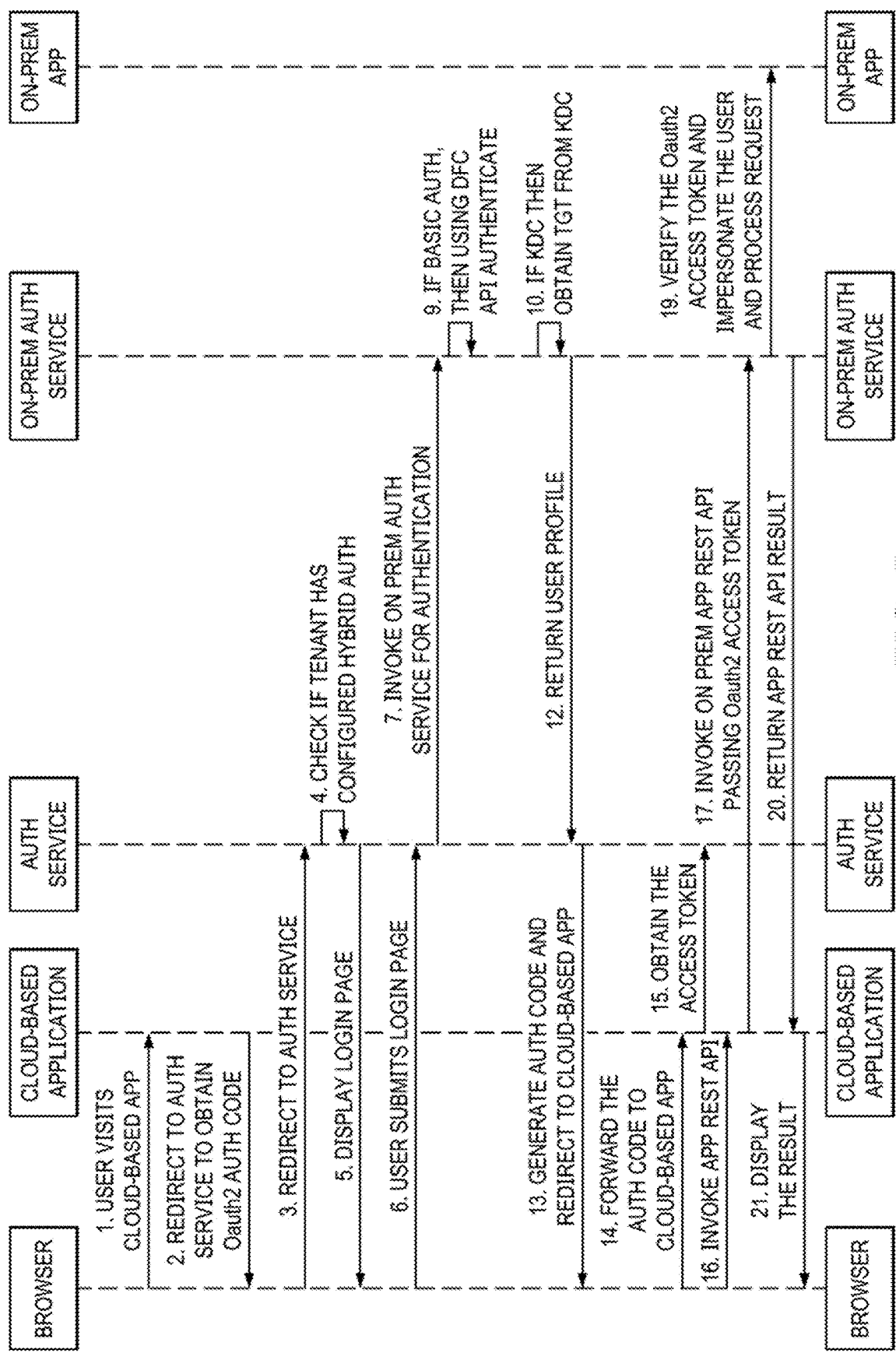
Figure 8:
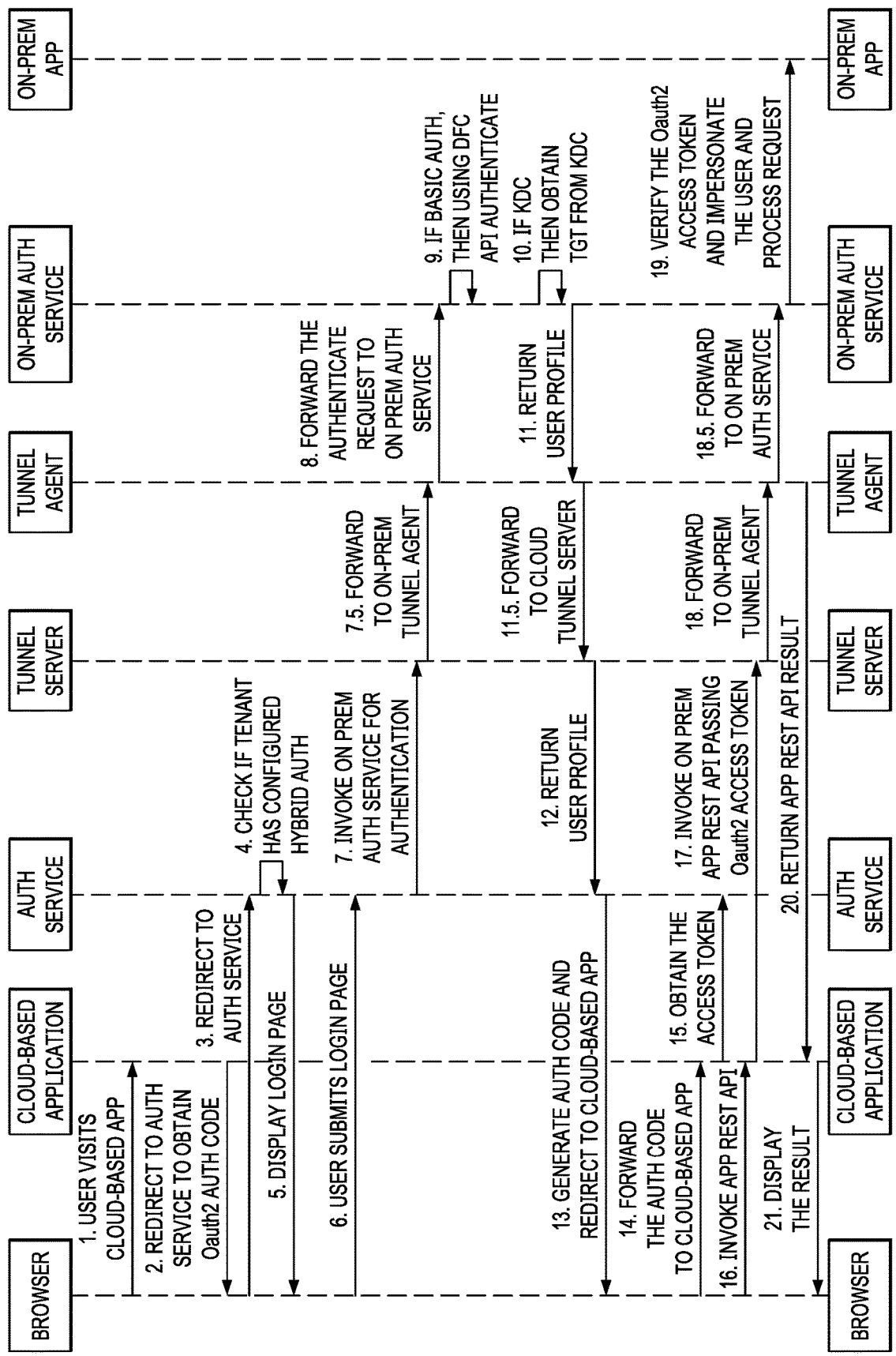

FIGS. 6-8 depict hybrid authentication flow sequence diagrams for exemplary embodiments described above. Various steps illustrated in FIGS. 6-8 are sequentially numbered. Similar steps in the figures use the same reference numbers. Note that, for clarity, similar steps in each figure share the same number. Therefore, while it may appear that some sequential numbers are missing (e.g., step 8 in FIG. 7, etc.), the numbers were merely maintained to be consistent with the other figures. The sequence diagrams illustrate processes taking place among a browser, a cloud-based application (e.g., "Express"), a cloud-based authentication service, a tunnel connection (e.g., tunnel server/tunnel agent), an on-premises authentication service, and on-premises D2 application.

In FIG. 6, the process begins with step 1, where a user (e.g., an employee of an enterprise) visits a cloud-based application, for example, by entering a URL into a browser. The cloud-based application redirects the user's browser to a cloud-based authentication service (step 2) to obtain an authentication code (e.g., an Oauth2 AUTH CODE). The browser is then directed to the cloud-based authentication service (step 3). The cloud-based authentication service then checks with the MTS (e.g., MTS 319) to see if the tenant (e.g., the user's employer, the enterprise that operates an on-premises system) is configured for hybrid authentication (step 4). If so, a login page is displayed to the user through the browser (step 5).

At step 6, the user submits a login page with user credentials to the cloud-based authentication service. This triggers the cloud-based authentication service to invoke the on-premises authentication service for authentication (step 7) (e.g., via a tunneling protocol to the on-premises authentication service) (described in more detail with respect to FIG. 8). In response, the authenticate request is forwarded (via the tunneling protocol) to the on-premises authentication service (step 8). If a basic authentication is used, then an API-based authentication (e.g., the DFC API authentication) is used (step 9). If a KDC (e.g., Kerberos authentication) is used, then a ticket granting ticket (TGT, or "super ticket") is obtained from the KDC server (step 10). Note that, the enterprise may configure the authentication service to use whatever authentication scheme they want to use. The authentication scheme used may depend on the on-premises repository that the user is trying to access.

At steps 11 and 12, an appropriate user profile for the user is returned by the on-premises authentication service to the cloud-based authentication service (e.g., through the tunnel). The cloud-based authentication service then generates an authentication code and redirects the browser to the cloud-based application (step 13). The browser forwards the authentication code to the cloud-based application (step 14), which obtains an access token from the authentication service using the authentication code (step 15). With the access token, the browser then invokes a REST API for the on-premises application that the user is trying to access (step 16). In response, the cloud-based application invokes the on-premises REST API, passing the access token to the on-premises authentication service, via the tunneling protocol (steps 17, 18). The on-premises authentication service verifies the access token and impersonates the user and processes the request via the on-premises application (step 19). The REST API result is then returned (e.g., through the tunnel) to the cloud-based application (step 20). Finally, the result is displayed on the browser (step 21).

FIG. 7 depicts a hybrid authentication flow sequence diagram without using a tunneling protocol (compare FIGS. 3 and 4). In FIG. 7, some steps are the same or similar as in FIG. 6. While some FIG. 6 steps are not a part of the sequence of FIG. 7, the numbering of the remaining sequential steps are maintained, for clarity, so steps that are the same or similar to steps in FIG. 6 will share the same number.

In FIG. 7, the process begins with step 1, where a user visits a cloud-based application, for example, by entering a URL into a browser. The cloud-based application redirects the user's browser to a cloud-based authentication service (step 2) to obtain an authentication code. The browser is then directed to the cloud-based authentication service (step 3). The cloud-based authentication service then checks with the MTS (e.g., MTS 419) to see if the tenant is configured for hybrid authentication (step 4). If so, a login page is displayed to the user on the browser (step 5).

At step 6, the user submits a login page with user credentials to the cloud-based authentication service. This triggers the cloud-based authentication service to invoke the on-premises authentication service for authentication (step 7). If a basic authentication is used, then an API-based authentication is used (step 9). If a KDC is used, then a super ticket is obtained from the KDC server (step 10). Again, the enterprise may configure the authentication service to use whatever authentication scheme they want to use. The authentication scheme used may depend on the on-premises repository that the user is trying to access.

At step 12, an appropriate user profile for the user is returned by the on-premises authentication service to the cloud-based authentication service. The cloud-based authentication service then generates an authentication code and redirects the browser to the cloud-based application (step 13). The browser then forwards the authentication code to the cloud-based application (step 14), which obtains an access token from the cloud-based authentication service using the authentication code (step 15). Wth the access token, the browser then invokes a REST API for the on-premises application that the user is trying to access (step 16). In response, the cloud-based application invokes the on-premises REST API, passing the access token to the on-premises authentication service (step 17). The on-premises authentication service verifies the access token and impersonates the user and processes the request via the on-premises application (step 19). The REST API result is then returned to the cloud-based application (step 20). Finally, the result is displayed on the browser (step 21).

FIG. 8 depicts a hybrid authentication flow sequence diagram similar to FIG. 6, but shows steps at both the cloud deployed tunnel server and the on-premises tunnel agent (see FIG. 3). In FIG. 8, the process begins with step 1, where a user visits a cloud-based application, for example, by entering a URL into a browser. The cloud-based application redirects the user's browser to the cloud-based authentication service (step 2) to obtain an authentication code. The browser is then directed to the cloud-based authentication service (step 3). The cloud-based authentication service then checks with the MTS (e.g., MTS 319) to see if the tenant is configured for hybrid authentication (step 4). If so, a login page is displayed to the user on the browser (step 5).

At step 6, the user submits a login page with user credentials to the cloud-based authentication service. This triggers the cloud-based authentication service to invoke the on-premises authentication service for authentication (step 7) via the tunnel server. The tunnel server forwards the request to the on-premises tunnel agent (step 7.5). In response, the authenticate request is forwarded to the on-premises authentication service (step 8). If a basic authentication is used, then an API-based authentication is used (step 9). If a KDC is used, then a super ticket is obtained from the KDC server (step 10). Again, the enterprise may configure the authentication service to use whatever authentication scheme they want to use. The authentication scheme used may depend on the on-premises repository that the user is trying to access.

At step 11, an appropriate user profile for the user is returned and forwarded by the tunnel agent to the tunnel server (step 11.5). The user profile is then returned by the tunnel server to the cloud-based authentication service (step 12). The cloud-based authentication service then generates an authentication code and redirects the browser to the cloud-based application (step 13). The browser forwards the authentication code to the cloud-based application (step 14), which obtains an access token from the cloud-based authentication service using the authentication code (step 15). The browser then invokes a REST API for the on-premises application that the user is trying to access (step 16). In response, the cloud-based application invokes the on-premises REST API, passing the access token to the tunnel server (step 17). The tunnel server forwards the access token to the on-premises tunnel agent (step 18). The on-premises tunnel agent then forwards the access token to the on-premises authentication service (step 18.5). The on-premises authentication service verifies the access token and impersonates the user and processes the request via the on-premises application (step 19). The REST API result is then returned to the could-based application, via the tunnel agent and tunnel server (step 20). Finally, the result is displayed on the browser (step 21).

Embodiments of a hybrid authentication system described above also enable a cloud-based system to configure, authenticate, and store authentication information for a plurality of users in the cloud for one or more remote on-premises systems. Since a user can belong to multiple groups in the system, and the same groups can be authorized in multiple cloud applications, the system may implement sharable user groups, which are groups of users sharing similar user credentials.

FIGS. 9-10 depict diagrammatic representations of a user interface for an administrator to configure hybrid authentication according to some embodiments. More specifically, FIG. 9 shows a non-limiting example of a user interface for an administrator to add a connection between a cloud-based application (to which an enterprise can subscribe, automatically or manually, for its users to use) and an on-premises repository. The administrator can navigate to the authentication proxy service connection setup page shown in FIG. 9 and provide the necessary information (e.g., the name of the connection, the description of the connection, the URL to the on-premises authentication service proxy (e.g., on-premises authentication service proxy 324, 424, 524), and a tunneling port on a host (e.g., tunnel server 330), if tunneling is used). Once the connection is added, the administrator can select "hybrid authentication" as the authentication scheme and set the cloud-based application to use the connection thus configured when connecting to the on-premises repository. In some embodiments, the administrator can configure the authentication scheme (e.g., where the administrator selects "hybrid authentication" as the authentication scheme) using an MTS API to communicate with the MTS (e.g., MTS 116, 319, 419).

In some embodiments, a table for the enterprise/tenant is modified to reflect schema changes. For example, the MTS can add new columns to the tenant table to store tenant-specific authentication schemes. In this case, in addition to SAML, OIDC, a hybrid authentication scheme configuration is added to the tenant table. The MTS service application has a pointer to the URL for the on-premises authentication service proxy (e.g., on-premises authentication service proxy 324, 424, 524).

If the connection is configured to use tunneling, a tunneling agent (e.g., tunnel agent 332) would need to be deployed on the premises of the enterprise/tenant. The tunneling agent can be configured with connection details configured by the administrator using the administrator interface. Below is a non-limiting example of tunneling agent configuration:

```
# leap auth server configuration
authServer.url=https://authservice...
authServer.clientID=...
authServer.clientSecret=...
# tenant connection setup
tunnel.names=...
tunnel.tenant.id=...
tunnel.agent.name=...
# leap tunnel server configuration
tunnel.server.url=https://tunnelservice...
http.proxy.enabled=false
http.proxy.host=localhost
http.proxy.port=80
http.proxy.username=user
http.proxy.password=password
http.proxy.backend.request.enabled=false
```

When an end user accesses a cloud-based application (e.g., cloud-based applications 316, 318, 416, 418), a request to a cloud-based authentication service '/authorize' end point can determine the authentication type or selection. For instance, the cloud-based authentication service (e.g., cloud-based authentication service 314, 414) may communicate with the MTS (e.g., MTS 319, 419) to request authentication information for the tenant associated with the end user. If the tenant has selected or otherwise activated the hybrid authentication scheme, then the cloud-based authentication service is operable to obtain the tenant identity, the hybrid authentication URL, and the hybrid connection name (which have been configured by the administrator, as illustrated in FIG. 9, and stored in the tenant table accessible by the MTS) from the MTS and proceed accordingly.

For example, if the hybrid authentication is publicly accessible, the cloud-based authentication service can us the information provided by the MTS to connect to the on-premises authentication service proxy (e.g., on-premises authentication service proxy 324) over a tunnel (see e.g., FIGS. 3 and 6). If the hybrid authentication is not publicly accessible, the cloud-based authentication service can invoke the on-premises authentication service proxy using login information provided by the user (see e.g., FIGS. 4 and 7).

FIG. 10 depicts a diagrammatic representation of login page 1000. In some embodiments, an end user can provide user login 1001 and password 1001 through login page 1000 and select login button 1003 to log into a cloud-based application. In this example, login page 1000 provides the end user with a choice to use SSO 1005. Typically, SSO is accomplished using the same credentials from a directory server such as the Lightweight Directory Access Protocol (LDAP) servers. In this case, however, the cloud-based authentication service delegates the authentication to the on-premises authentication service. If a hybrid connection has been configured (such that the MTS can retrieve a hybrid connection name and its value from the tenant table and provide same to the cloud-based authentication service), the tenant identifier and the hybrid connection name are passed by the cloud-based authentication service to the on-premises authentication service in the HTTP authentication header. Below is a non-limiting example of such a request and response:

```
Request
    POST /authproxy/login HTTP/1.1
    HOST: appproxy...
    content-type: application/x-www-form-urlencoded
    tenant-id: ...
    connection-name: acme-auth-proxy
    content-length: 64
    {
    "username": "alibaba",
    "password": "opensesame"
    }
Response
    {
    "userId": "alibaba10",
    "userEmail": "alibaba@acme.com",
    "userGroups": ["finance", "marketing"],
    "authDatabase": "acme1"
    }
Generate a JWT token:
    }
    "sub": "joe@acme.com",
    "userId": "joe",
    "authDatabase": "acme1",
    "iss": "https://authservice...",
    "exp": ...
    }
```

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

What is claimed is:

1. A method for authenticating a user to an on-premises system through a cloud platform, the method comprising:
   determining, by a cloud-based authentication service running on a first computer operating in a cloud computing environment, whether a tenant of the cloud computing environment is configured for hybrid authentication;
   responsive to the tenant of the cloud computing environment being configured for hybrid authentication, presenting, by the cloud-based authentication service, a login page in a browser on a user device;
   receiving, by the cloud-based authentication service through the login page in the browser on the user device, login credentials of a user associated with the tenant;
   invoking, by the cloud-based authentication service responsive to receipt of the login credentials of the user, an on-premises authentication service through a tunnel server, the on-premises authentication service running on a second computer operating in an enterprise computing environment, wherein the tunnel server sends an authentication request to a tunnel agent, which forwards the authentication request to the on-premises authentication service, the authentication request containing the login credentials of the user, wherein the login credentials of the user is used by the on-premises authentication service to obtain a user profile for the user;
   receiving, by the cloud-based authentication service through the tunnel agent and the tunnel server, the user profile for the user from the on-premises authentication service;
   generating, by the cloud-based authentication service, an authentication code using the user profile;
   communicating the authentication code to the browser running on the user device, wherein the browser forwards the authentication code generated by the cloud-based authentication service to a cloud-based application running within the browser; and
   responsive to a request from the cloud-based application, passing an access token to the on-premises authentication service through the tunnel server and the tunnel agent, the request from the cloud-based application containing the authentication code generated by the cloud-based authentication service, the passing performed by the cloud-based authentication service, the on-premises authentication service verifying the access token and authenticating as the user to an on-premises content server.

2. The method according to claim 1, wherein the tunnel server operates in the cloud computing environment and wherein the tunnel agent operates in the enterprise computing environment.

3. The method according to claim 1, wherein the on-premises authentication service is a Web service acting as a proxy for the cloud-based authentication service operating in the cloud computing environment.

4. The method according to claim 1, wherein the on-premises authentication service is operable to obtain the user profile for the user from an on-premises identity management system.

5. The method according to claim 1, wherein the access token is passed, through the tunnel server and the tunnel agent, to the on-premises authentication service in an authentication header.

6. The method according to claim 1, wherein the on-premises authentication service authenticates the user using an on-premises user authentication.

7. The method according to claim 1, wherein the access token is a JavaScript Object Notation (JSON) Web Token (JWT) token that is digitally signed using JSON Web Signature.

8. A system for authenticating a user to an on-premises system through a cloud platform, comprising:
   a processor;
   a non-transitory computer readable medium; and
   stored instructions translatable by the processor to perform:
      determining whether a tenant of a cloud computing environment is configured for hybrid authentication;
      responsive to the tenant of the cloud computing environment being configured for hybrid authentication, presenting a login page in a browser on a user device;
      receiving, through the login page in the browser on the user device login credentials of a user associated with the tenant;
      responsive to receipt of the login credentials of the user, invoking art on-premises authentication service through a tunnel server, the on-premises authentication service running on a computer operating in an enterprise computing environment, wherein the server sends an authentication request to a tunnel agent, which forwards the authentication request to the on-premises authentication service, the authentication request containing the login credentials of the user, wherein the login credentials of the user is used by the on-premises authentication service to obtain a user profile for the user;
      receiving through the tunnel agent and the tunnel server, the user profile for the user from the on-premises authentication service;

generating an authentication code using the user profile;

communicating the authentication code to, the browser running on the user device, wherein the browser forwards the authentication code generated by the cloud-based authentication service to a cloud-based application running within the browser; and responsive to a request from the cloud-based application, passing an access token to the on-premises authentication service through the tunnel server and the tunnel agent, the request from the cloud-based application containing the authentication code generated by the cloud-based authentication service, the on-premises authentication service verifying the access token and authenticating as the user to an on-premises content server.

9. The system of claim 8, wherein the tunnel server operates in the cloud computing environment and wherein the tunnel agent operates in the enterprise computing environment.

10. The system of claim 8, wherein the on-premises authentication service is a Web service acting as a proxy for a cloud-based authentication service operating in a cloud computing environment.

11. The system of claim 8, wherein the on-premises authentication service is operable to obtain the user profile for the user from an on-premises identity management system.

12. The system of claim 8, wherein the access token is passed, through the tunnel server and the tunnel agent, to the on-premises authentication service in an authentication header.

13. The system of claim 8, wherein the on-premises authentication service authenticates the user using an on-premises user authentication.

14. The system of claim 8, wherein the access token is a JavaScript Object Notation (JSON) Web Token (JWT) token that is digitally signed using JSON Web Signature.

15. A computer program product for authenticating a user to an on-premises system through a cloud platform, the computer program product comprising a non-transitory computer-readable medium storing instructions translatable by a processor to perform:

determining whether a tenant of cloud computing environment configured for hybrid authentication;

responsive to the tenant of the cloud computing environment being configured for hybrid authentication, presenting a login page in a browser on a user device;

receiving, through the login page in the browser on the user device, login credentials of a user associated with the tenant;

responsive to receipt of the login credentials of the user, invoking an on-premises authentication service through a tunnel server, the on-premises authentication service running on a computer operating in an enterprise computing environment, wherein the server sends an authentication request to a tunnel agent, which forwards the authentication request to the on-premises authentication service, the authentication request containing the login credentials of the user, wherein the login credentials of the user is used by the on-premises authentication service to obtain a user profile for the user;

receiving, through the tunnel agent and the tunnel server, the user profile for the user from the on-premises authentication service;

generating an authentication code using the user profile;

communicating the authentication code to the browser running on the user device, wherein the browser forwards the authentication code generated by the cloud-based authentication service to a cloud-based application running within the browser; and responsive to, a request from the cloud-based application, passing an access token to the on-premises authentication service through the tunnel server and the tunnel agent, the request from the cloud-based application containing the authentication code generated by the cloud-based authentication service, the on-premises authentication service verifying the access token and authenticating a user to an on-premises content server.

16. The computer program product of claim 15, wherein the tunnel server operates in the cloud computing environment and wherein the tunnel agent operates in the enterprise computing environment.

17. The computer program product of claim 15, wherein the on-premises authentication service is a Web service acting as a proxy for a cloud-based authentication service operating in a cloud computing environment.

18. The computer program product of claim 15, wherein the on-premises authentication service is operable to obtain the user profile for the user from an on-premises identity management system.

19. The computer program product of claim 15, wherein the access token is passed, through the tunnel server and the tunnel agent, to the on-premises authentication service in an authentication header.

20. The computer program product of claim 15, wherein the on-premises authentication service authenticates the user using an on-premises user authentication.

* * * * *